Jan. 14, 1964 J. BRUNN 3,118,082
TUNING OF CAVITY RESONATORS FOR REFLEX KLYSTRONS BY MEANS OF MAGNETICALLY CONTROLLED FERRITE MATERIALS
Filed March 17, 1960
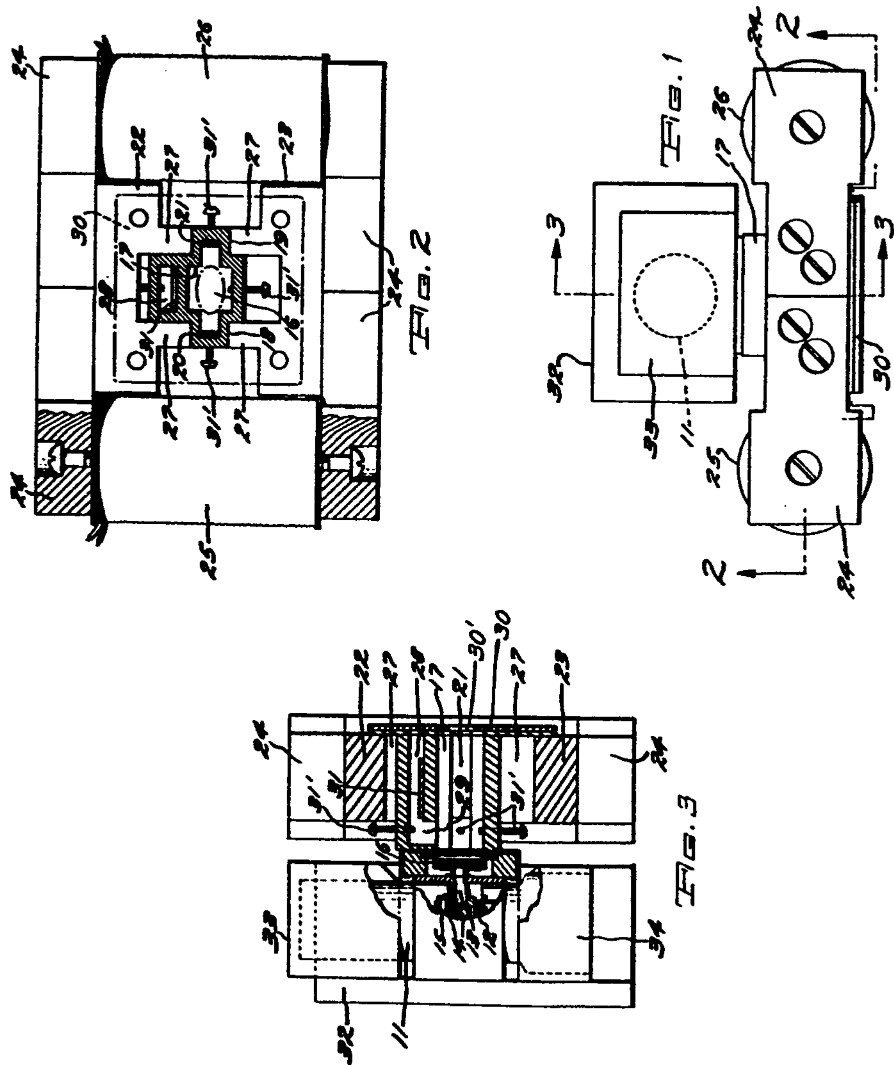
INVENTOR.
John Brunn
BY
Wm J. Nolan
ATTORNEY

United States Patent Office 3,118,082
Patented Jan. 14, 1964

3,118,082

TUNING OF CAVITY RESONATORS FOR REFLEX KLYSTRONS BY MEANS OF MAGNETICALLY CONTROLLED FERRITE MATERIALS

John Brunn, Palo Alto, Calif., assignor to Varian Associates, Palo Alto, Calif., a corporation of California Filed Mar. 17, 1960, Ser. No. 15,750
2 Claims. (Cl. 315—5.21)

The present invention relates in general to cavity resonators and more particularly to a cavity resonator employing novel electrical tuning by ferrites.

One of the common ways of tuning a cavity resonator is by the mechanical movement of a surface boundary within the resonator. for example. a side wall or tuning plunger or by the movement of certain types of members within the cavity resonator such as capacitive tuning screws and the like. It has been proposed to employ electrical tuning of such cavity resonators by placing a ferrite material in particular selected locations within the cavity and by applying a variable magnetic field to the ferrite in a proper direction. Changing the strength of this magnetic field. for example, by varying the current to an electromagnet winding, results in a change in the resonance frequency of the cavity resonator. The advantage of such a device is that the cavity resonator may be easily and rapidly tuned from remote locations. One of the main disadvantages to this ferrite tuning scheme is the necessity for employing a sufficiently strong and sufficiently variable. and thus large and heavy, magnet to produce the necessary range of magnetic field strengths to take the cavity resonator through its desired tuning range.

It is, therefore. the object of the present invention to provide an electrically tunable cavity resonator employing ferrites in magnetic fields wherein the cavity resonator is so constructed that the magnetic field strength for producing the desired tuning is kept to a minimum thereby resulting in the use of a magnet of considerably smaller size and weight than heretofore used.

One feature of the present invention is the provision of a tunable cavity resonator employing ferrites therein and a magnet means for producing magnetic fields traversing the ferrite, the cavity resonator being so formed that a cross section through the walls of the cavity takes the form, generally, of a cross, the opposite side arms of the cross being short in height relative to the height of the central portion of the cavity resonator, the ferrite being positioned in these side arms and the magnet means being so positioned that the magnetic fields traverse the ferrite in the shortened-height direction.

Another feature of the present invention is the provision of a tunable cavity resonator of the above featured type wherein the cavity resonator takes the form of an elongated hollow inclosure of substantially rectangular cross-section, two opposite sides thereof having elongated hollow, outwardly extending portions or arms in which the ferrite material is located.

Another feature of the present invention is the provision of a reflex klystron of the internal cavity-external cavity resonator type, the internal cavity resonator being within the vacuum envelope and heavily coupled through a vacuum sealed iris window to a tunable external cavity resonator, the external cavity resonator having ferrite material positioned in recesses located in the side walls, said recesses being relatively short in height, and a magnet means positioned so that the recesses are within the gaps of the magnet, the magnetic field strength of the magnet being variable over a range of magnetic field strengths whereby the frequency of operation of the reflex klystron may be varied over its tuning range.

These and other objects and advantages of the present invention will become apparent upon a perusal of the following specification taken in connection with the accompanying drawings wherein:

FIG. 1 is a plan view of a typical electrically tunable cavity resonator structure made in accordance with the present invention and utilized as the external cavity of a reflex klystron of the internal-external cavity resonator type.

FIG. 2 is a cross-section view taken through a portion of FIG. 1 along section lines 2—2 therein, and FIG. 3 is a cross-section view of the structure of FIG. 1 taken along section line 3—3 therein.

Referring now to the drawings. there is shown a typical reflex klystron utilizing one preferred embodiment of the present invention. A reflex klystron 11 of known type is shown partly broken away and having a cathode 12, an internal cavity resonator 13 partially formed by resonator grids 14. and an electron reflector electrode 15. The internal cavity resonator 13 is coupled through a vacuum sealed ceramic window 16 to the external cavity resonator 17 formed in accordance with the present invention. This external cavity resonator which is. for example, made of brass has the general form of an elongated wave guide having a cross section in the form of a cross. The two side arms or hollow. elongated outwardly extending portions 18 and 19, which extend out from the main or central portion 17. contain slabs of ferrite 20 and 21. respectively, such as a ferrite purchased under the trade name "General Ceramics R-1."

A magnetic structure is positioned around the cross-shaped cavity resonator including a pair of pole pieces 22 and 23 of soft iron fixedly secured to a closed yoke member 24. the two outer sides of the yoke member carrying a pair of electrical windings 25 and 26 to which the magnetic field producing currents are applied. The two pole pieces 22 and 23 are each provided with a pair of pole extensions 27. the opposite pole extensions on each pole member providing a magnetic field gap into which the two side arms 18 and 19 of the external cavity resonator are snugly fitted.

The outer end of the external cavity resonator 17 is provided with closure means or flange 30 having an egress opening 30' therein. The closure means for the inner end of the cavity 17 is formed by the reflex klystron, ingress to the cavity 17 being by way of window 16.

The cavity resonator is also provided with a mode suppressing wave trap in the form of a small rectangular wave guide 28 coupled to the main wave guide through the coupling opening 29, and containing lossy material such as resistant card 31. A plurality of mode suppressor screws 31' are also threaded into the external cavity resonator for assisting in suppressing undesired modes of operation of the tunable reflex klystron.

The fringing field present from the magnet structure is prevented from disturbing the electron beam in the reflex klystron 11 by the magnetic shielding placed around the klystron. This shielding is particularly essential around the reflector region since the electrons are more easily deflected when they are moving slowly. This magnetic shielding consists of a main block 32 of shielding material such as iron encircling the electron beam region of the reflex klystron and two end cap blocks 33 and 34 slipped over the ends of the klystron.

The present invention results in a cavity resonator which is electrically tunable over a very wide frequency band. In the embodiment utilized to magnetically tune an X-band reflex klystron, the klystron was tuned over a range of approximately one thousand megacycles. Maximum tuning was obtained by the use of symmetrical slabs positioned against the sides of the rectangular cavity and a transverse D.C. magnetic field threading the ferrites. As the magnetic field is increased in such situation, the resonant frequency of the cavity resonator also increases in a roughly linear manner. One may describe the behavior of the ferrite in the cavity resonator in terms of an effective microwave permeability which decreases as the applied magnetic field increases. The net effect of this is an exclusion of the radio frequency fields from the ferrite region, making the cavity resonator electrically smaller and the resonant frequency proportionately higher for increasing values of D.C. magnetic field threading the ferrite.

In order to properly select the optimum cavity configuration for the tunable cavity resonator, several factors were considered; namely, (1) high electrical impedance, (2) small gap for magnetic field, (3) wide tuning range and high power output of the experimental reflex klystron, (4) ease of suppression of high order modes and (5) ease of magnetic shielding of the reflex klystron tube. It was discovered that the novel configuration of cavity resonator disclosed in the present application provided optimum overall results for the factors under consideration and, in particular, provided both a high electrical impedance and a small magnetic field gap. In other words, the use of the cavity resonator in the form of a cross with the ferrites located in the two shortened height side recesses, i.e., the vertical dimension of portions 18 and 19 as viewed in FIG. 2 is less than the vertical dimension of main portion 17, provides a cavity resonator with a high electrical impedance and yet permits the use of a magnet with a small magnetic field gap, resulting in a considerable savings on magnetic field producing materials.

In one klystron tube constructed and tested, the ferrites were approximately .100" thick, .16" high and .80" long and were cemented to the side walls of the cavity.

The two magnet coils were wound with 2500 turns of number 30 copper wire and were connected in series. A current of .5 ampere through these windings produced a magnetic field of about 2,000 gauss across each of the narrow gaps. Varying this magnet current between zero and .5 ampere tuned the X-band reflex klystron tube over a range of 1,200 megacycles.

The wide band electrical tuning accomplished by the ferrite in the cavity resonator is also accompanied by a lower klystron efficiency, due to losses in the ferrite, than in mechanically tuned klystrons of the same type. The efficiency may be improved by the use of lower loss ferrite materials as they become available. By decreasing the total tuning range desired, for example, by using lower D.C. fields or less ferrite, the lower klystron circuit efficiency could also be raised thus approaching the mechanically tuned reflex klystron of the present art.

It should be understood that a cavity resonator with the particular shape of a cross in its cross sectional configuration may be employed to advantage in uses other than the tuning of a reflex klystron. For example, a cavity resonator of this type may be utilized as a broadband microwave filter circuit.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnetically tunable cavity resonator comprising a hollow elongated wave guide having closure means with ingress and egress openings therein, said wave guide having a cross section in the form of a cross with a central hollow portion and a pair of elongated, hollow, outwardly extending portions extending from the two opposite sides of said central portion, the vertical dimension of said side portions being less than the vertical dimension of said central portion, ferrites positioned in said two side portions, a magnetic field producing means for producing magnetic fields extending through each of the two side portions in the vertical direction and threading the ferrites, and electrical coil means associated with the magnetic field producing means for varying the strength of said magnetic field whereby the resonant frequency of the cavity resonator may be varied.

2. A magnetically tunable reflex klystron comprising a main body having a cathode, a reflector and an internal cavity resonator positioned therebetween, said main body being vacuum sealed, the internal cavity resonator being coupled through a vacuum sealed iris window to a magnetically tunable external cavity resonator, said external cavity resonator being formed of an elongated wave guide having a cross section in the form of a cross with a central hollow portion and a pair of elongated hollow outwardly extending portions extending from the two opposite sides of said central portion, the vertical dimension of said side portions being less than the vertical dimension of said central portion, said side portions each containing a ferrite material, and a variable magnetic field producing means comprising an electro-magnet for producing a magnetic field traversing the two side portions in the vertical direction and threading the ferrite, variation of the strength of the magnetic field threading the ferrites varying the resonant frequency of the external cavity resonator to tune the reflex klystron over its band of frequencies.

References Cited in the file of this patent

UNITED STATES PATENTS 2,897,455 Jones et al. ------------- July 28, 1959